(12) United States Patent
Huntsberger et al.

(10) Patent No.: US 6,405,817 B1
(45) Date of Patent: Jun. 18, 2002

(54) RIDE-ON VEHICLE WITH DIRECTION RESPONSIVE MECHANISM

(75) Inventors: Kurt J. Huntsberger, Chaffee; Daniel J. Damon, West Seneca, both of NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/499,554

(22) Filed: Feb. 7, 2000

(51) Int. Cl.[7] .......................... A63G 19/20; B60K 1/00; A63H 17/36
(52) U.S. Cl. ................ 180/65.1; 280/1.165; 280/1.202; 280/47.11; 446/460; 446/468
(58) Field of Search ........................ 280/87.01, 87.043, 280/87.05, 47.11, 270, 282, 293, 263, 267, 771, 774, 1.13, 1.165, 1.201, 1.202, 1.16, 1.203, 288.4; 446/454, 460, 468

(56) References Cited

U.S. PATENT DOCUMENTS

| | | | | |
|---|---|---|---|---|
| 1,361,584 A | * | 12/1920 | Howard | 446/460 |
| 1,399,833 A | * | 12/1921 | Wiebe | 280/1.13 |
| 1,467,271 A | * | 9/1923 | Gutekunst | 280/7.1 |
| 1,773,567 A | * | 8/1930 | Bradley | 280/87.043 |
| 1,872,289 A | * | 8/1932 | Hester | 280/240 |
| D170,947 S | * | 11/1953 | Scheppele | D21/428 |
| 3,370,861 A | * | 2/1968 | Lenta | 280/1.202 |
| 3,485,507 A | * | 12/1969 | Christof | 280/202 |
| 3,507,511 A | * | 4/1970 | Seidel | 280/47.11 |
| 3,592,486 A | * | 7/1971 | Fox | 280/209 |
| 3,794,352 A | * | 2/1974 | Popp | 280/209 |
| 3,827,719 A | * | 8/1974 | Lohr et al. | 280/259 |
| 3,935,916 A | * | 2/1976 | Farraro | 180/33 R |
| 3,963,262 A | * | 6/1976 | Estell | 280/231 |
| 4,150,839 A | * | 4/1979 | Tucker et al. | 280/771 |
| D252,652 S | | 8/1979 | Nakao et al. | D21/74 |
| 4,265,461 A | * | 5/1981 | Okubo | 280/1.13 |
| D262,385 S | | 12/1981 | Nakao et al. | D21/78 |
| 4,562,893 A | * | 1/1986 | Cunard | 180/6.5 |
| 4,741,544 A | | 5/1988 | Kassai | 280/1.13 |
| 4,744,573 A | * | 5/1988 | Most | 280/1.13 |
| D306,748 S | | 3/1990 | Takahashi et al. | D21/74 |
| D379,407 S | | 5/1997 | Liu | D6/351 |
| 5,697,621 A | * | 12/1997 | Nazarian | 280/1.165 |
| 5,845,724 A | * | 12/1998 | Barrett | 180/65.1 |
| 5,924,713 A | * | 7/1999 | Li | 280/270 |
| D423,603 S | | 4/2000 | Tasy | D21/424 |
| D423,604 S | | 4/2000 | Yeh | D21/433 |
| 6,120,048 A | * | 9/2000 | Li | 280/270 |
| 6,155,902 A | * | 12/2000 | Kole, Jr. et al. | 446/230 |
| D436,386 S | | 1/2001 | Huntsberger | D21/424 |
| D437,005 S | | 1/2001 | Huntsberger | D21/424 |
| D441,808 S | | 5/2001 | Huntsberger | D21/424 |
| D443,316 S | | 6/2001 | Huntsberger | D21/424 |

OTHER PUBLICATIONS

The Disney Kids Catalog, p. 16, 1991.
The Disney Catalog, p. 30, 1989.

* cited by examiner

Primary Examiner—Brian L. Johnson
Assistant Examiner—Bridget Avery
(74) Attorney, Agent, or Firm—Kolisch, Hartwell, Dickinson, McCormack & Heuser, PC (57) ABSTRACT

A children's ride-on vehicle and associated rotation translation assembly are provided. The children's ride-on vehicle includes a body, a plurality of wheels rotatably mounted to the body, and at least one steerable wheel. The vehicle also includes a steering mechanism including a steering column and an associated steering handle. The steering handle is configured to be actuated by a rider sitting on a seat of the vehicle to thereby cause the steerable wheel to turn. The vehicle further includes a direction responsive member extending from the outer surface of the body, the direction responsive member being coupled to the steering mechanism through a linkage assembly and configured to rotate in response to movement of the steering handle.

31 Claims, 5 Drawing Sheets

RIDE-ON VEHICLE WITH DIRECTION RESPONSIVE MECHANISM

TECHNICAL FIELD

The invention relates generally to children's ride-on vehicles, and more particularly to a children's ride-on vehicle with a direction responsive mechanism.

BACKGROUND

Children's ride-on vehicles, or ride-ons, are reduced-scale vehicles designed to be sat upon and ridden by children. Ride-on vehicles may include figures of characters that are familiar to children, such as storybook, fairytale, or cartoon characters. The figures enhance the ride experience for the child, and provide manufacturers the ability to market ride-on vehicles in conjunction with well-known characters.

Prior ride-on vehicles with figures suffer from the drawback that the figures, such as stickers or other static images mounted thereon, do not move or otherwise interact with the action of a child rider. For example, a company called The Little Tikes Company of Hudson, Ohio has made a product called the Pooh Rumbly Racer Car that is pushed by a parent or propelled by a child's feet pushing against the ground. The product has three-dimensional figures fixed relative to the body of the vehicle so the figures do not move or otherwise respond to the child's actions.

Little Tikes also makes a product called the Pooh Friend Ship Wagon that is a wagon that is pulled by a parent or other individual and includes free-spinning casters that are secured to the vehicle by mounts including a three-dimensional figure. Much like the wheel of a shopping cart, the caster wheel and the figure rotate freely about a vertical axis due to contact between the wheel and ground. This adds amusement to the child because the wheel and figure will rotate in complete circles with only minor changes in direction to the vehicle. However, the child riding in the wagon is not able to direct or otherwise control the movement of the figure, and the wagon requires a parent or other individual to pull the wagon.

It would be desirable to provide children with an interactive ride experience, by linking the movement of a figure on a ride-on vehicle with the action of a child riding the vehicle, to further enhance the ride experience for the child.

SUMMARY OF THE INVENTION

A children's ride-on vehicle and associated rotation translation assembly are provided. The children's ride-on vehicle includes a body having an outer surface and a seat. The vehicle also includes a plurality of wheels rotatably mounted to the body. The plurality of wheels includes at least one steerable wheel. The vehicle also includes a steering mechanism with a steering column and an associated steering handle, the steering column being rotatably coupled to the body and to the steerable wheel. The steering handle is configured to be actuated by a rider sitting on the seat to thereby cause the steerable wheel to turn. The vehicle further includes a direction responsive member extending from the outer surface of the body, the direction responsive member being coupled to the steering mechanism through a linkage assembly and configured to rotate in response to movement of the steering handle. The vehicle may also include a drive assembly and/or a sound producing assembly.

Many other features of the present invention will become manifest to those versed in the art upon making reference to the detailed description which follows and the accompanying sheets of drawings in which preferred embodiments incorporating the principles of this invention are disclosed as illustrative examples only.

DETAILED DESCRIPTION AND BEST MODE OF THE INVENTION

Figure 1:
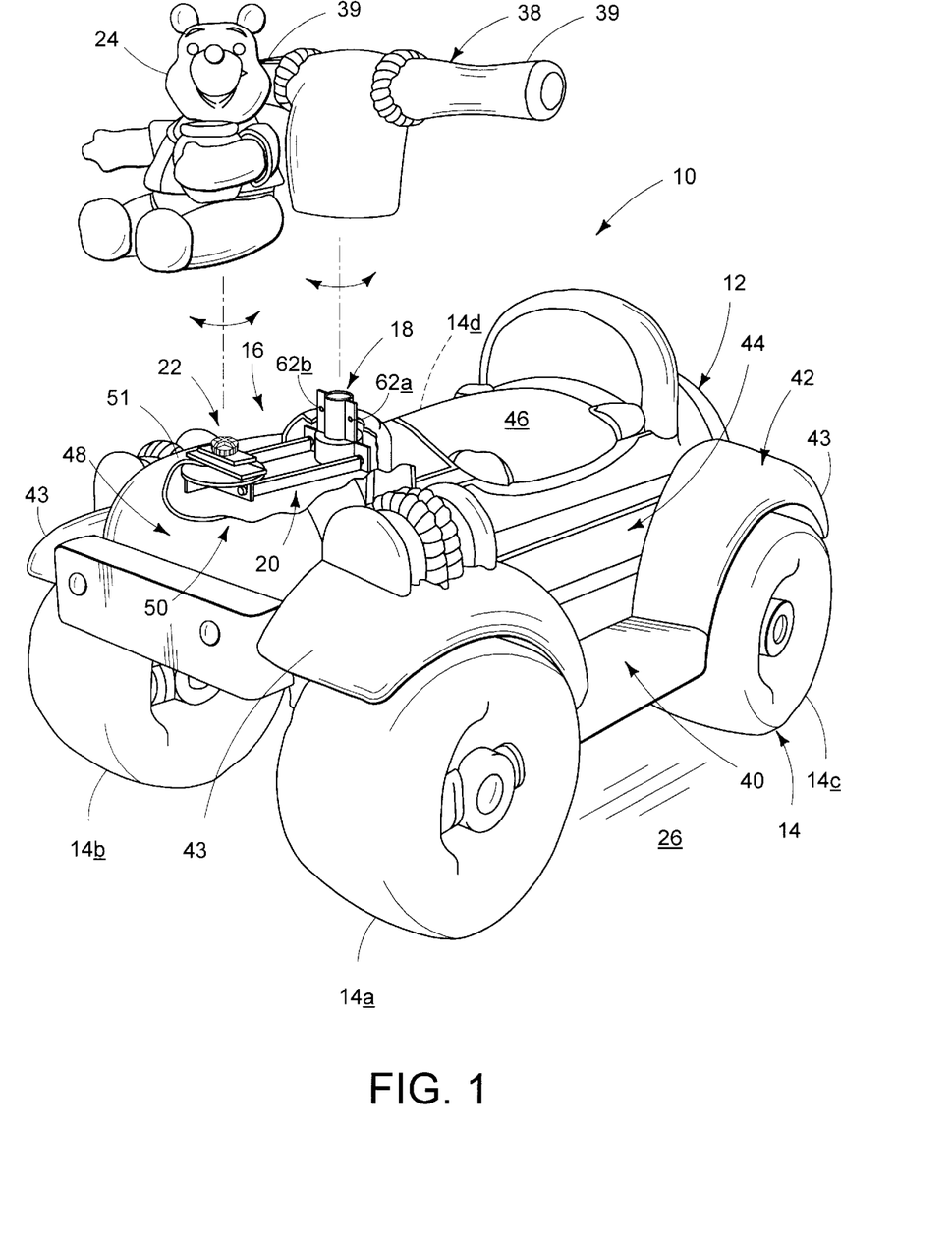
FIG. 1 is a partially exploded perspective view of a children's ride-on vehicle according to the present invention.

A children's ride-on vehicle according to the present invention is shown in FIG. 1 and generally at 10. Vehicle 10 includes a body 12, a plurality of wheels 14a–d rotatably mounted to the body, a steering handle 38, and a rotation translation assembly 16. Rotation translation assembly 16 includes a steering mechanism 18 linked via a linkage assembly 20 to a rotatable support 22 and direction responsive member 24, such that support 22 and direction responsive member 24 rotate in correlation with steering mechanism 18.

The plurality of wheels includes at least one steerable wheel that is coupled to the vehicle's steering mechanism 18 so that the steerable wheels turn back and forth under the control of the steering mechanism. In FIG. 1, vehicle 10 is shown with a pair of steerable front wheels 14a and 14b, however, it should be understood that the vehicle may include a steerable wheel that is a rear wheel, a central wheel, or a wheel mounted in some other predetermined location.

The plurality of wheels also typically includes at least one driven wheel that is driven to propel the vehicle over terrain 26. As shown in FIG. 1, vehicle 10 includes a pair of driven wheels 14c and 14d, which are operatively coupled to a drive assembly 28, shown in FIG. 11. It should be understood that the number of wheels, including the number of driven and steerable wheels may vary, depending upon the particular construction of the vehicle. For example, a single wheel may be both a driven wheel and a steerable wheel. Similarly, some of the wheels may be neither driven nor steerable.

Figure 11:
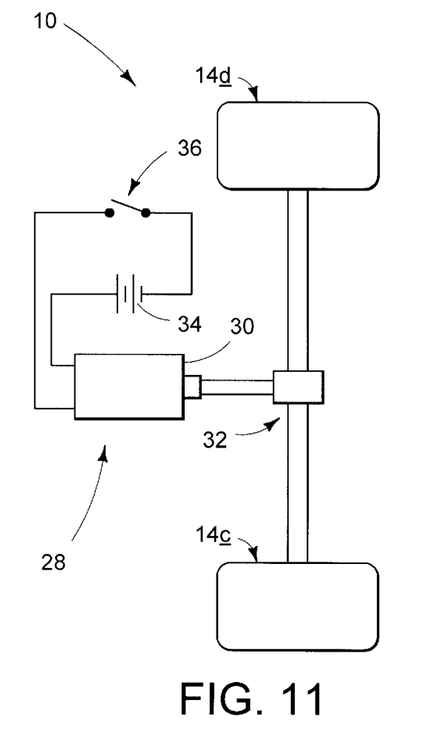
FIG. 11 is a schematic view of a drive assembly of the vehicle of FIG. 1.

Drive assembly 28 typically includes a motor assembly 30 and a power train 32 configured to transfer driving power from motor assembly 30 to driven wheels 14c and 14d. Motor assembly 30 includes at least one motor, and power train 32 typically includes a gear-and-shaft assembly. Alternatively, it will be understood that a belt, screw, chain, or other suitable power transfer mechanisms also may be used. In addition, it will be understood that the drive assembly may not include a power train, and motor assembly 30 may be coupled directly to one or more of the driven wheels.

Figure 12:
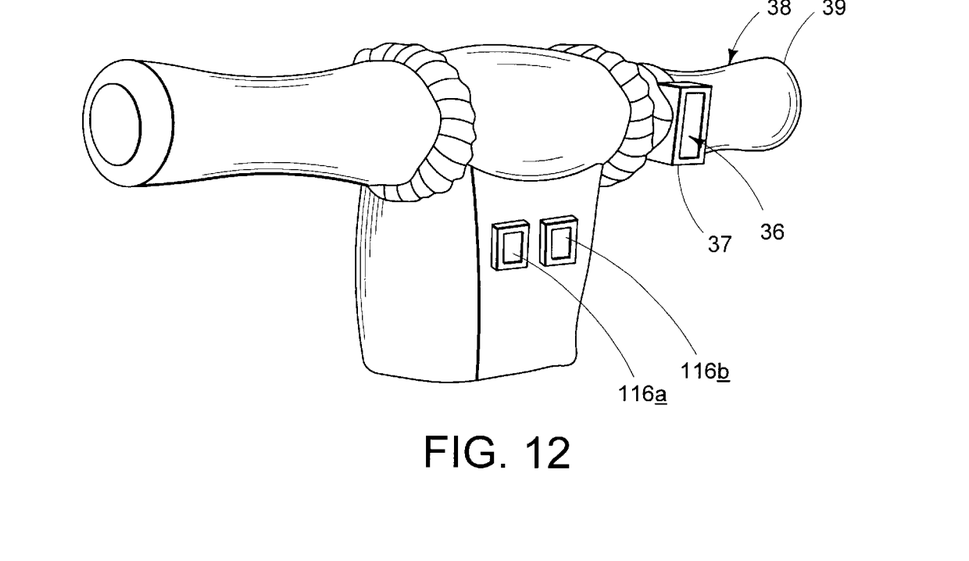
FIG. 12 is an isometric view of the steering handle of the vehicle of FIG. 1.

As discussed, motor assembly 30 includes at least one electrically powered motor. The motor assembly is powered by a battery assembly 34 and controlled by a throttle 36. Battery assembly 34 includes at least one battery. An example of a suitable throttle 36 is an on/off switch that selectively interrupts the flow of current from battery assembly 34 to motor assembly 30. An example of an on/off switch mounted on vehicle 10 is shown in FIG. 12, with the switch generally indicated at 37. As shown, the throttle is mounted on a steering handle 38 of steering mechanism 18. Another suitable example of throttle 36 is a variable position switch that may be used to control the speed of the vehicle in a variable manner. For example, steering handle 38 may include a rotatable hand grip 39 that regulates the delivery of current to the motor responsive to the rotational position of the hand grip. Similarly, vehicle 10 may include a foot-operated lever that may be depressed by a child sitting on the vehicle's seat to drive the vehicle, much like the gas pedal of a full-sized automobile.

Alternatively, the vehicle may not include a driven wheel or drive assembly, and may be propelled by the rider. For example, the vehicle may be a so-called foot-to-floor vehicle configured to be propelled by pushing the rider's feet against the ground. In this embodiment of the invention, the vehicle's footrests 40, which are shown in FIG. 1, typically are wholly or partially removed from the body to allow the legs of the rider easier access to the ground. In another embodiment of the invention, the vehicle may be driven by a pedaling action of the rider. In this embodiment, the drive assembly includes a pedal subassembly operatively coupled via a power transfer mechanism to the driven wheel.

Returning to FIG. 1, it can be seen that body 12 includes an upper surface 42 defining fenders 43, a central chassis portion 44, and a seat 46. The body also includes a front portion 48 having a hood region 50 located forward of steering mechanism 18 and intermediate the front wheels of the vehicle. Seat 46 is positioned such that a child rider may grip the steering handle 38 while seated on the seat. In FIG. 1, steering handle 38 is illustrated to be an elongate bar with spaced-apart handgrips 39, It should be understood that steering handle 38 may also include a steering wheel or any other suitable mechanism to enable a child sitting on seat 46 to steer the vehicle.

Direction responsive member 24 is mounted to support 22, and is configured to rotate along with support 22. Direction responsive member 24 is typically a figurine 24, and in one preferred embodiment of the invention is a three-dimensional character. As shown in FIG. 1, member 24 takes the form of the Winnie the Pooh™ character, the image of which is used by permission. As used herein, the term "figurine" is meant to broadly include virtually any two- and three-dimensional shape, image, character, caricature, etc., depending upon the "theme" of the vehicle. For example, member 24 may take the shape of storybook and fairytale characters, cartoon characters, stuffed animals, sports figures, animated or actual television or movie characters, etc. The figurine may be formed from any suitable material, including a rigid material such as molded plastic, or a deformable, soft material such as stuffed fabric.

Figure 7:
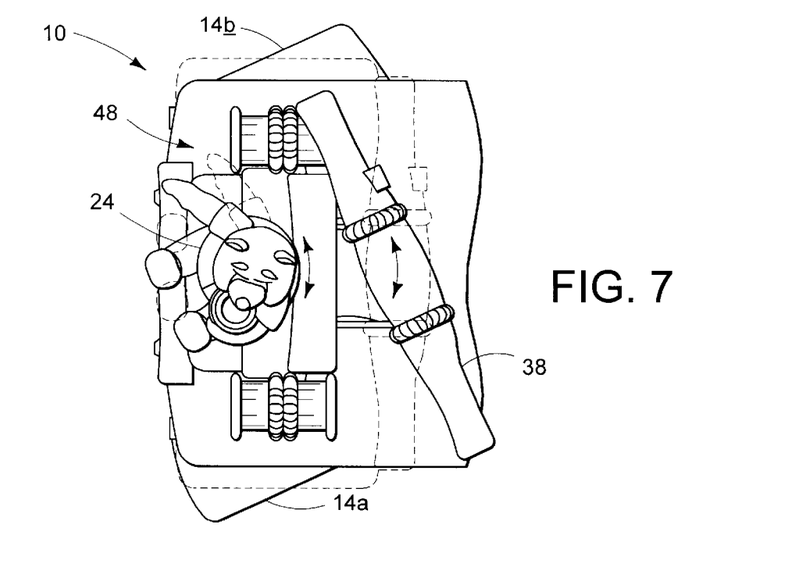
FIG. 7 is a fragmentary top plan view of the vehicle of FIG. 1, showing the steering handle and direction responsive member.
Figure 8:
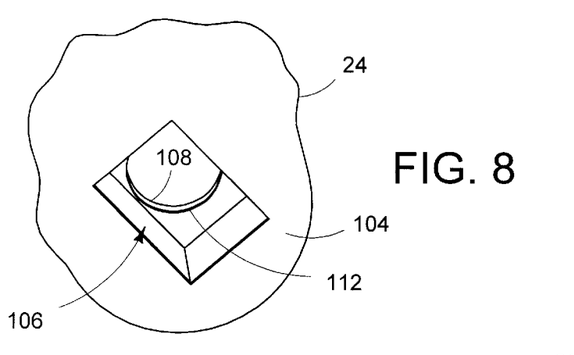
FIG. 8 is an isometric view of the bottom of the direction responsive member of the vehicle of FIG. 1.

As shown in FIG. 7, direction responsive member 24 rotates in correlation with steering handle 38. Preferably, the rotation is synchronous, and in tandem, such that the direction responsive member 24 faces substantially in a direction of travel of the vehicle. Direction responsive member 24 also typically faces in substantially the same direction as steerable wheels 14a and 14b. Alternatively, direction responsive member 24 may face in some other predetermined direction relative to steering handle 38.

Also shown in FIG. 1 is a platform 51, which is configured to support direction responsive member 24 and rotatable support 22 on hood region 50. Typically, support 22 extends through aperture 96 in platform 51. Alternatively, the direction responsive member may extend through aperture 96. In another embodiment of the invention, the support and/or direction responsive member may be mounted directly to the body.

Figure 2:
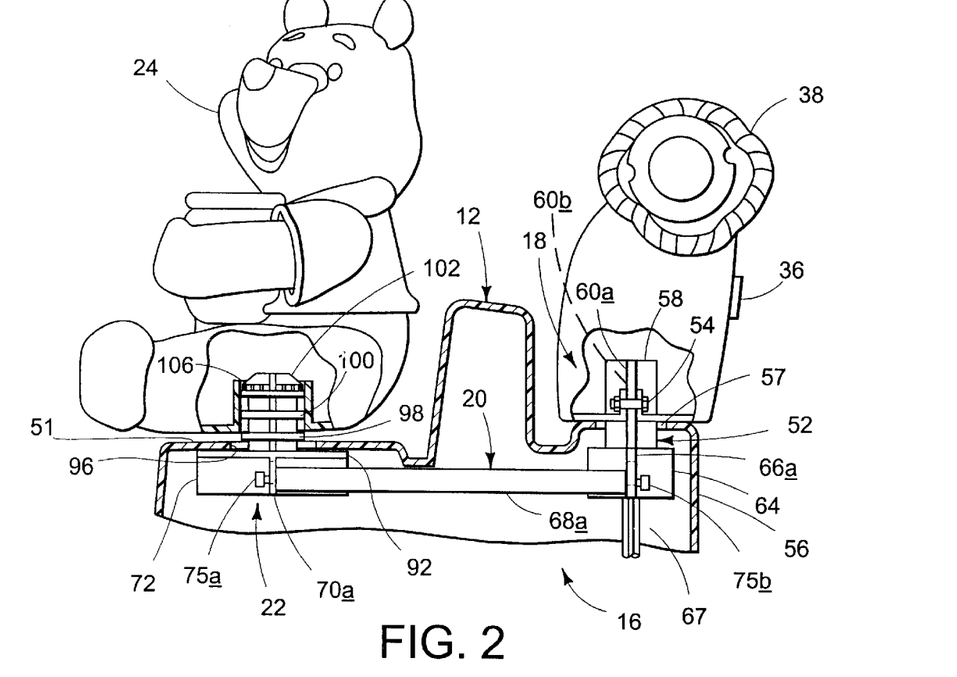
FIG. 2 is a side elevation view showing in partial cross-section a rotation translation assembly of the vehicle of FIG. 1.

As shown in FIG. 2, steering mechanism 18 includes a steering column 52 mounted to steering handle 38 by fasteners 54, which may be screws, rivets, bolts, pins, etc. Steering column 52 is rotatably mounted within a housing 56 formed in body 12. The steering column includes an upper portion 58 that extends through a hole 57 in the top of housing 56. Tabs 60a and 60b, which are shown in FIG. 2, extend from upper portion 58 of the steering column 52. Each tab 60a, 60b includes a respective hole 62a, 62b that is configured to receive a corresponding fastener, as described above. Steering column 52 also typically includes a lower portion 64 having oppositely extending tabs 66a and 66b, which are discussed in more detail below.

Figures 5, 6:
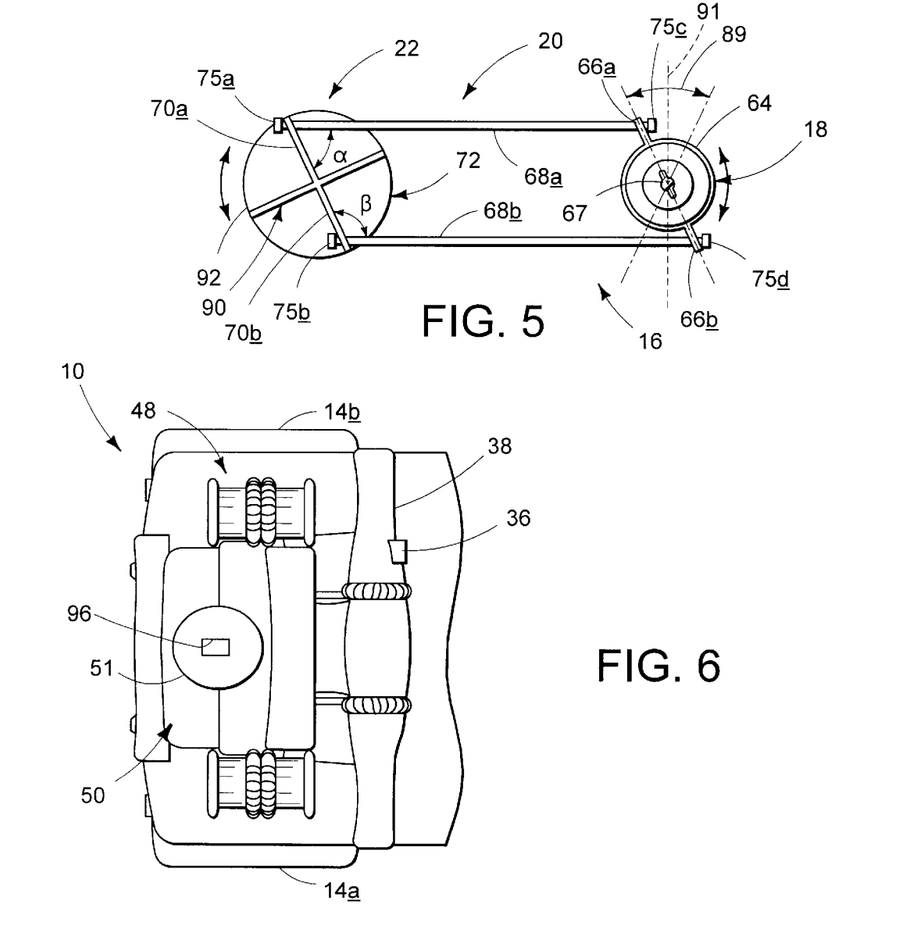
FIG. 5 is a bottom plan view of the rotation translation assembly of FIG. 2.
FIG. 6 is a fragmentary top plan view of the vehicle of FIG. 1, with the direction responsive member removed.

A shaft 67 having a key-like cross-section, as shown in FIG. 5, extends downward through the upper and lower portions of the steering column. Shaft 67 interconnects with a lower steering assembly (not shown). Rotation of shaft 67 causes the lower steering assembly to turn steerable wheels 14a and 14b.

Figure 4:
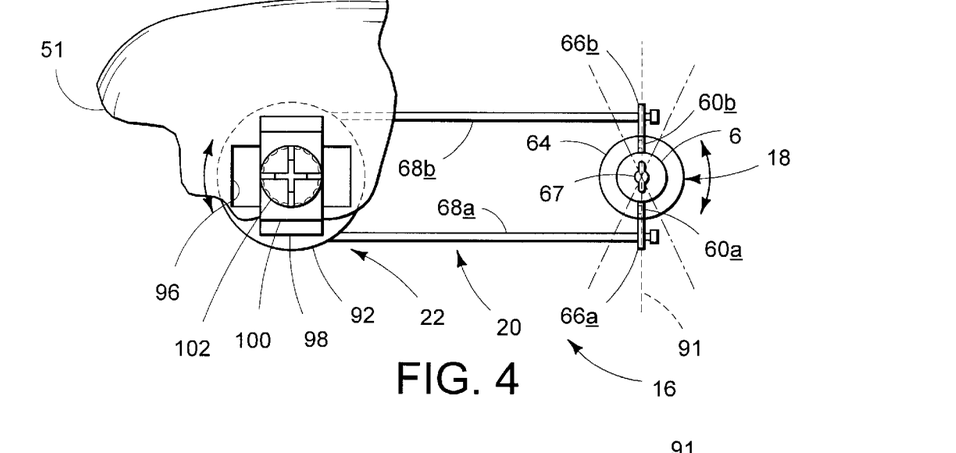
FIG. 4 is a fragmentary top plan view of the rotation translation assembly of FIG. 2.

As shown in FIGS. 4 and 5, linkage assembly 20 typically includes first and second elongate members 68a and 68b. Each elongate member is attached adjacent a first, steering-side end to a corresponding tab 66a, 66b on the lower portion 64 of the steering column 52, and at a second, support-side end to a corresponding tab 70a, 70b on a lower portion 72 of rotatable support 22. The elongate members synchronize the movement of member 24 with the movement of steering handle 38. Therefore, as a child sitting on seat 46 rotates the steering handle to turn the steerable wheel or wheels, the direction responsive member, in this case the Pooh™ character, turns with the handle 38 and faces the direction in which the vehicle is being steered.

Alternatively, the linkage assembly may include only a single elongate member, or may include more than two elongate members, or may rotatively couple steering mechanism 18 and support 22 via a belt, chain, gear, motor, or other suitable coupling assembly. In addition, it will be understood that steering column 52 and rotatable support 22 may not include tabs, and the elongate members 68a, 68b may attach at another predetermined location on the steering column and support, such as directly to side walls of the steering column and support.

Figure 9:
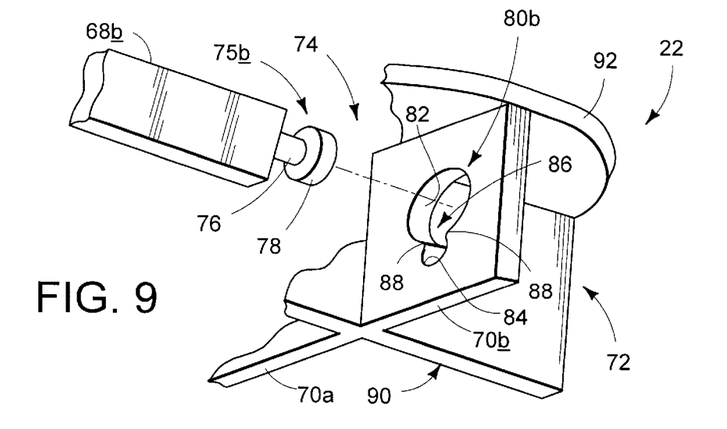
FIG. 9 is an isometric view of a portion of the rotation translation assembly of FIG. 2.

Elongate members 68a, 68b typically attach to tabs 66a, 66b of steering column 52 and to tabs 70a, 70b of support 22 via a projection-and-slot attachment mechanism 74. An example of a suitable mechanism is shown in FIG. 9 and described with particular reference to tab 70b and elongate member 68b. However, it will be understood that a similar projection-and-slot attachment mechanism typically is used to attach each of the first and second ends of the first and second elongate members 68a, 68b to a corresponding tab 66a, 66b 70a, or 70b.

Projection-and-slot attachment mechanism 74 includes a projecting member 75b, and a slot 80b. The projecting member 75b typically includes a neck 76 terminating in a cap, or head, 78 of larger size than the neck. Slot 80b includes interconnected openings 82 and 84, which are of different sizes. As shown, the openings are connected by a narrow passageway 86 formed by opposed ridges 88. Narrow passageway 86 is slightly narrower than the width of neck 76, such that the neck 76 may pass from the large opening 82 to the small opening 84 only by the application of force by an installer. To secure elongate member 68b in the slot 80b, cap 78 and neck 76 are configured to slide through large opening 82 and snap down such that the neck rests in the small opening 84. Ridges 88 prevent the unintentional removal of neck 76 from the small opening 84. Alternatively, it will be understood that slot 80b may be of another size and shape adapted to receive projecting member 75b.

As shown in FIG. 5, when the projecting member of each end of the elongate members 68a, 68b is secured within a corresponding slot, the angles at which the elongate members intersect the tabs on steering mechanism 18 and support 22 are free to change as the elongate members rock back and forth. As the steering column rotates, the elongate members transfer rotational motion from steering mechanism 18 to support 22 by pushing the sides of support 22 back and forth. This causes steering mechanism 18 and support 22 to undergo correlative rotation within a predetermined rotation range, shown at 89. Typically, predetermined rotation range 89 is between approximately −45 degrees and 45 degrees relative to a horizontal axis 91. In a preferred embodiment, the predetermined rotation range is between approximately −25 degrees and 25 degrees relative to horizontal axis 91, however other ranges of rotation may be used and are within the scope of the invention. It should be understood that varying the length of neck 76 relative to the thickness of openings 82 and 84 is one suitable way to vary the range of rotation. The correlative rotation of support 22 and steering mechanism 18 is typically synchronous. Alternatively, the correlative rotation of the support relative to the steering mechanism may be asynchronous, delayed, abbreviated, or otherwise altered.

As shown in FIG. 5, rotatable support 22 includes a lower portion 72 including a reinforcing cross-fin structure 90 having tabs 70a and 70b with respective slots 80a, 80b sized to receive projections 75a and 75b of the supportside end of each of elongate members 68a and 68b. Support 22 further includes a disc 92 positioned above the reinforcing cross-fin structure 90. Disc 92 abuts and rotates against a lower surface of platform 51 of body 12, constraining support 22 from upward movement relative to body 12 and allowing rotational movement of support 22 relative to body 12.

Figure 3:
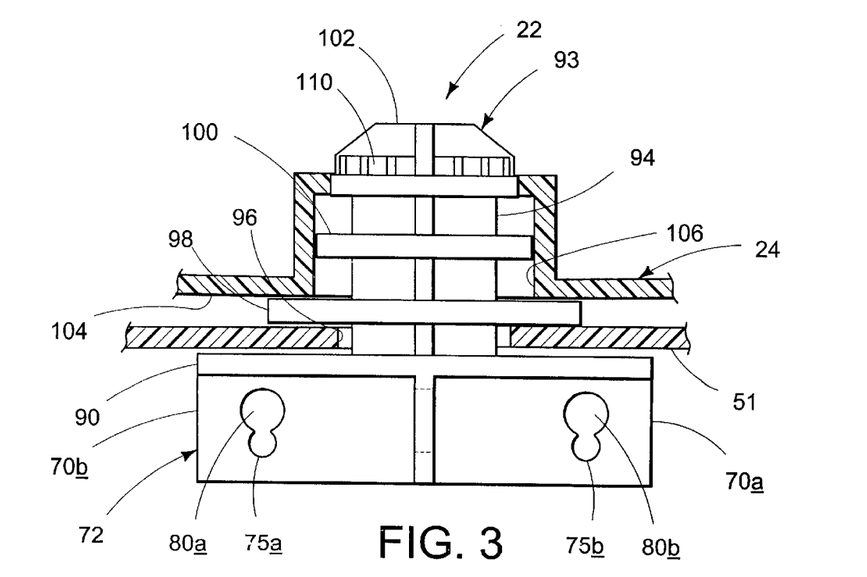
FIG. 3 is a cross-sectional front elevation view of the rotation translation assembly of FIG. 2.

Support 22 further includes a mount 93 that is positioned above the lower portion 72, such as shown in FIG. 3. Mount 93 typically includes a shaft 94 extending upward from disc 92 through an aperture 96 in platform 51 of body 12. Shaft 94 is formed from a cross-fin structure that extends longitudinally along the length of the shaft. Support 22 also includes a lower plate 98, an upper plate 100, and a post 102 attached at spaced-apart intervals along shaft 94.

Lower plate 98 is rectangular as viewed from the top, and sized to fit through aperture 96 when rotated 90 degrees from the orientation shown in FIG. 4. This allows for easy installation of the support upward from the bottom of the body through aperture 96. With direction responsive member 24 and elongate members 68a, 68b removed from support 22, the support is inserted through aperture 96 until disc 92 contacts the bottom surface of body 12. At this point, the support is rotated 90 degrees to the orientation shown in FIG. 4, thereby causing rectangular lower plate 98 to overlap portions of body 12 on each side of the short axis of the aperture. Once installed, support 22 is constrained from upward and downward movement by contact of disc 92 and lower plate 98 with body 12, and is free to rotate. A lower surface 104 of the direction responsive member 24 is configured to rest on the lower plate 98.

Upper plate 100 is also rectangular in shape as viewed from the top, and is typically smaller along its long axis than lower plate 98. Upper plate 100 is configured to be positioned in a cavity 106 in the lower surface 104 of the direction responsive member 24. Cavity 106 typically is also rectangular in shape, and is configured such that when upper plate 100 is installed in the cavity, support 22 is constrained from rotating relative to direction responsive member 24.

Post 102 extends upward from shaft 94 and is sized to be received within a corresponding opening 108 in cavity 106 of the direction responsive member 24. Typically, post 102 is slightly larger (typically at least 3/16th inch larger) than the opening 108, and the post and opening are press-fit together. Ribs 110 along an outer edge of post 102 are configured to press into an inner edge 112 of opening 108, to thereby secure the post in the opening and to inhibit rotation of the post within the opening.

Alternatively, support 22 may include a mount constructed in another manner suitable to secure the direction responsive member to the support. For example, it will be understood that the mount may be a hole in the support and the direction responsive member may include a post configured to extend into the hole. In addition, virtually any other suitable attachment device may be used to secure the direction responsive member to the support, such as a threaded fastener, adhesive, rivet, weld, etc. It will also be understood that the rotation translation assembly 16 may not include a support, and that linkage assembly 20 may attach directly to direction responsive member 24.

Figure 10:
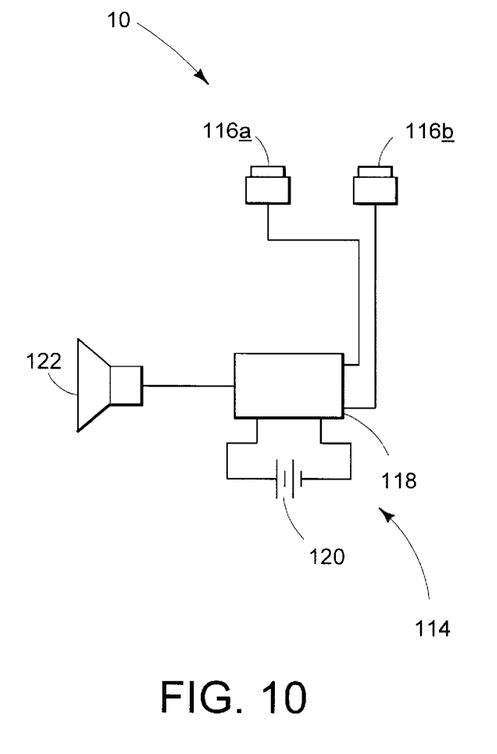
FIG. 10 is a schematic view of a sound producing assembly of the vehicle of FIG. 1.

As shown in FIG. 10, the vehicle typically includes a sound producing assembly 114 including sound switches 116a and 116b. The sound switches may be mounted in any location on the vehicle where they may be reached by a child sitting on seat 46. For example, in FIG. 11, the switches are shown mounted on steering handle 38. Alternatively, the sound switches may be mounted directly to body 12, or at another suitable location on the vehicle. Sound switches 116a and 116b may alternatively be a single switch that has dual or multiple positions for controlling two or more sounds. In addition, it will be understood that the vehicle may include only a single sound switch, or more than two sound switches.

Sound control switches 116a and 116b are connected to a sound control unit 118. The sound control unit 118 is powered by a sound control battery assembly 120, and typically includes stored sound recordings and an amplifier. Upon actuation of one of the switches, the sound control unit is configured to play a corresponding stored sound recording through speaker 122. For example, sound control unit 118 may include a specific recording for each switch, or it may include multiple recordings that are randomly selected by unit 118. The sound recordings typically relate to a character whose likeness is represented in the direction responsive member 24. It should be understood that vehicle 10 may be formed without the sound assembly.

While the invention has been disclosed in its preferred form, the specific embodiments thereof as disclosed and illustrated herein are not to be considered in a limiting sense as numerous variations are possible. It is intended that any singular terms used herein do not preclude the use of more than one of that element, and that embodiments utilizing more than one of any particular element are within the spirit and scope of the present invention. Applicants regard the subject matter of the invention to include all novel and non-obvious combinations and subcombinations of the various elements, features, functions and/or properties disclosed herein. No single feature, function, element or property of the disclosed embodiments is essential to all embodiments. The following claims define certain combinations and subcombinations that are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of applicants' invention.

We claim:

1. A children's ride-on vehicle, comprising:
   a body including an outer surface and a seat;
   a plurality of wheels rotatably mounted on the body, wherein the plurality of wheels includes at least one steerable wheel;
   a steering mechanism including a steering column and an associated steering handle, wherein the steering column is rotatable relative to the body and coupled to the steerable wheel, and further wherein the steering handle is configured to be actuated by a rider sitting on the seat to thereby cause the steerable wheel to turn; and
   a direction responsive member extending from the outer surface of the body, wherein the direction responsive member is coupled to the steering mechanism through a linkage assembly and configured to rotate in response to movement of the steering handle, and further wherein the direction responsive member is mounted forward of and spaced-apart from the steering handle.

2. The children's ride on vehicle of claim 1, wherein the direction responsive member and the steering handle are configured to rotate synchronously.

3. The children's ride on vehicle of claim 1, wherein the direction responsive member and the steering handle are configured to rotate within a predefined range of rotation.

4. The children's ride-on vehicle of claim 1, wherein the direction responsive member includes a figurine.

5. The children's ride-on vehicle of claim 1, wherein the body includes an upper surface and the direction responsive member is mounted adjacent the upper surface of the body.

6. The children's ride-on vehicle of claim 1, wherein the direction responsive member is mounted adjacent a front portion of the body.

7. The children's ride-on vehicle of claim 1, further comprising a rotatable support mounted adjacent the body, the support being coupled to the steering mechanism via the linkage assembly, the direction responsive member being mounted on the support.

8. The children's ride-on vehicle of claim 1, wherein the direction responsive member is configured to face in a direction of travel of the vehicle as the steering handle is turned by the rider.

9. The children's ride-on vehicle of claim 1, further comprising a drive assembly configured to drive at least one of the wheels.

10. The children's ride on vehicle of claim 3, wherein the predefined range of rotation is from approximately −45 degrees to 45 degrees from a horizontal axis.

11. The children's ride-on vehicle of claim 4, wherein the figurine includes a head with facial features.

12. The children's ride-on vehicle of claim 4, wherein the figurine includes a head and a torso that are adapted to move responsive to movement of the steering handle.

13. The children's ride-on vehicle of claim 4, wherein the figurine is formed from a rigid material.

14. The children's ride-on vehicle of claim 4, wherein the figurine has a shape corresponding to the group consisting of at least one of storybook characters, fairytale characters, cartoon characters, sports figures, television characters and movie characters.

15. The children's ride-on vehicle of claim 4, wherein the figurine is formed from a soft, deformable material.

16. The children's ride-on vehicle of claim 4, wherein the figurine is adapted to face in the same direction as the steerable wheel.

17. The children's ride-on vehicle of claim 4, further comprising a rotatable support spaced-apart from the steering handle and coupled to the steering mechanism via the linkage assembly, and wherein the figurine is coupled to the support.

18. The children's ride-on vehicle of claim 7, wherein the linkage assembly includes an elongate member coupled at a first end to the rotatable support and at a second end to the steering mechanism.

19. The children's ride-on vehicle of claim 7, wherein the rotatable support includes a mount adapted to receive the direction responsive member.

20. The children's ride-on vehicle of claim 7, wherein the rotatable support includes a shaft configured to extend through an aperture in an upper surface of the body.

21. The children's ride-on vehicle of claim 9, wherein the drive assembly includes a battery-powered motor assembly.

22. The children's ride on vehicle of claim 10, wherein the predefined range of rotation is from approximately −25 degrees to 25 degrees from a horizontal axis.

23. The children's ride-on vehicle of claim 17, wherein the linkage assembly includes an elongate member coupled at a first end to the rotatable support and at a second end to the steering mechanism.

24. The children's ride-on vehicle of claim 18, wherein the elongate member and rotatable support are connected by a projection-and-slot attachment mechanism.

25. The children's ride-on vehicle of claim 18, wherein the steering mechanism further includes a steering column extending from the steering handle, and the second end of the elongate member is coupled to the steering column.

26. The children's ride-on vehicle of claim 18, wherein the linkage assembly further includes a second elongate member, and wherein each of the first and second elongate members is coupled at a respective first end to an opposing side of the rotatable support and at a respective second end to an opposing side of the steering column.

27. The children's ride-on vehicle of claim 19, wherein the mount is a projecting member, and the direction responsive member is press-fit onto the projecting member.

28. The children's ride-on vehicle of claim 20, wherein the rotatable support includes a plate attached to the shaft, the plate being configured to rotate with the shaft relative to the body, and at least partially constrain the support from moving longitudinally relative to the body.

29. The children's ride-on vehicle of claim 23, wherein the elongate member and rotatable support are connected by a projection-and-slot attachment mechanism.

30. The children's ride-on vehicle of claim 23, wherein the steering mechanism further includes a steering column extending from the steering handle, and the second end of the elongate member is coupled to the steering column.

31. The children's ride-on vehicle of claim 23, wherein the linkage assembly further includes a second elongate member, and wherein each of the first and second elongate members is coupled at a respective first end to an opposing side of the rotatable support and at a respective second end to an opposing side of the steering column.

* * * * *